United States Patent [19]

Wolgamot et al.

[11] Patent Number: 5,660,021
[45] Date of Patent: Aug. 26, 1997

[54] SECURITY OF BUILDINGS AND OTHER STRUCTURES

[75] Inventors: Steven F. Wolgamot, Mahtomedi, Minn.; George A. Cooper, Shropshire, England

[73] Assignee: Trussbilt, Inc., New Brighton, Minn.

[21] Appl. No.: 529,407

[22] Filed: Sep. 18, 1995

[30] Foreign Application Priority Data

Sep. 17, 1994 [GB] United Kingdom ............... 9418787

[51] Int. Cl.⁶ ............................................. A47B 13/08
[52] U.S. Cl. ............... 52/783.12; 52/796.1; 52/783.17; 52/783.19; 52/790.1; 109/76; 109/83
[58] Field of Search ............... 52/783.12, 796.1, 52/783.17, 783.19, 790.1; 109/58, 64, 76, 82, 83

[56] References Cited

U.S. PATENT DOCUMENTS

| | | |
|---|---|---|
| 3,186,896 | 6/1965 | Clem ........................... 52/783.17 X |
| 3,300,901 | 1/1967 | Eckel ........................... 52/783.12 X |
| 3,453,974 | 7/1969 | Gerard ........................... 109/83 |
| 3,638,589 | 2/1972 | Shoop ........................... 109/76 |
| 4,132,042 | 1/1979 | DiMaio ........................... 52/783.12 X |
| 4,178,859 | 12/1979 | Seiz et al. ........................... 109/76 X |
| 4,489,663 | 12/1984 | Poag et al. . |
| 4,567,100 | 1/1986 | Pickett et al. . |
| 4,615,166 | 10/1986 | Head ........................... 52/783.17 X |
| 4,630,420 | 12/1986 | Hagemeyer ........................... 52/796.1 X |
| 4,646,494 | 3/1987 | Saarinen et al. ........................... 52/796.1 X |
| 4,832,308 | 5/1989 | Slonimsky et al. ........................... 52/783.17 X |
| 4,836,084 | 6/1989 | Vogelesang et al. ........................... 109/82 X |
| 4,852,316 | 8/1989 | Webb ........................... 52/796.1 X |
| 5,200,256 | 4/1993 | Dunbar ........................... 109/83 X |
| 5,490,468 | 2/1996 | Polensky ........................... 109/76 X |

FOREIGN PATENT DOCUMENTS

| | | | |
|---|---|---|---|
| 228695 | 7/1987 | European Pat. Off. ............... 109/58 |
| 2365680 | 5/1978 | France ................................. 109/83 |
| 2588606 | 4/1987 | France ................................. 109/64 |
| 2418290 | 11/1975 | Germany .............................. 109/58 |
| 75946 | 10/1917 | Switzerland ........................ 109/82 |
| 1405112 | 7/1975 | United Kingdom ............... 109/58 |
| 2128720 | 5/1984 | United Kingdom . |
| 2154256 | 9/1985 | United Kingdom . |
| 409453 | 1/1991 | United Kingdom . |
| 2258488 | 10/1993 | United Kingdom . |

Primary Examiner—Carl D. Friedman
Assistant Examiner—Aimee E. McTigue
Attorney, Agent, or Firm—Dorsey & Whitney LLP

[57] ABSTRACT

An improved security door is provided that is a composite of multiple layers. The layers include a first hard layer, a second hard layer, a reinforcing layer disposed between and connecting the first and second hard layers, and a carbonizing layer provided adjacent the reinforcing layer. Other layers, either singularly or in combination, can be included to make the security door further resistant to penetration by various tools. The other layers can include a clogging layer, a mobile layer, a resilient layer, and further reinforcement layers.

23 Claims, 9 Drawing Sheets

SECURITY OF BUILDINGS AND OTHER STRUCTURES

This invention relates to reinforcement of access points to buildings and other structures. It is particularly, but not exclusively, concerned with reinforcement of security doors.

The levels of crime occurring in today's society are increasing. One of the particular growth areas in crime is burglary, and other offences in which intruders break into buildings. It is usual for such unauthorised entry to be effected through doors, windows, skylights and the like. Doors are generally provided at points of the building which are easily approachable. Accordingly, they are particularly prone to attacks by intruders wishing to effect entry into a building. The conventional approach to improvements of door security have been to simply strengthen the door itself. This has usually involved making doors thicker (and thus harder to cut through) or increasing the thickness of the outer skin, such as steel, forming the front surface (the attack face), and sometimes also the rear surface, of a door. Unfortunately, attempts to improve the security of doors by essentially making them bulkier have encouraged intruders to adopt means of attack which are more efficient. It is now not unusual for an intruder to use a jig saw, a chisel, a rotary saw or an oxyacetylene torch to cut through a door to enter a building.

Doors have been used on buildings for thousands of years. Certainly over the past several hundred years, doors have changed very little both in their basic design and the materials from which they are made. So fixed in the mind of workers in the field is the concept of what a door should be like, that doors continue to be made very much along the same lines as they have been made for hundreds of years.

Security doors are conventionally a planar wood layer sandwiched between two planar layers of harder material, for example steel.

It is an aim of the present invention to produce an improved security door. In particular the aim is to provide a security door which is highly resistant to the generation of an aperture in it through which an intruder can pass or release the locks.

According to a first aspect of the invention we provide a door comprising a plurality of layers.

This provides a composite construction of door.

In the past, doors have been designed for particular applications. A firedoor will generally be comprised of a fire-resistant material. Security doors are designed to protect against a particular attack mode, for example cutting tools, torches or physical impact. The example given above of a steel-wood-steel layered door is good at resisting some modes of attack but no so good at resisting others. By providing a composite door, we provide a door which can withstand a variety of attack modes. If the plurality of layers are of different materials individual layers may resist different attack modes and such a composite door may provide all-round attack resistance.

Preferably the door is between 25 and 100 mm thick. Preferably the door is between 40 and 80 mm thick. Most preferably the door is approximately 60 mm thick.

Preferably the door has three layers. The door may have more than three layers. The door may have four, five, six or more layers.

Preferably the door has a first hard layer. Preferably the first hard layer is disposed towards the attack face of the door. Preferably the first hard layer comprises a sheet of material at the front of the door. A surface of the sheet may comprise the attack face of the door. The first hard layer may comprise steel, or another metal.

Preferably the door has a second hard layer. Preferably the second hard layer is disposed towards the rear face of the door. Preferably the second hard layer comprises a sheet of material at the rear of the door. A surface of the sheet may comprise the rear face of the door. The second hard layer may comprise steel or another metal.

The hard layers may be relatively thin layers. Each may occupy between 0.5 and 5% of the thickness of the door. Preferably each occupies between 1 and 3% of the thickness of the door.

Surfaces of the first and second hard layers may comprise the attack face and the rear face respectively of the door. Preferably the first and second hard layers sandwich one or more layers between them.

Preferably the first and second hard layers comprise an outer skin. The skin may be made of steel. The skin may cover the front or the back of the door or both. Preferably the skin surrounds the front, the back and the sides of the door. It may also cover the upper and lower edges.

The skin may comprise a hollow section. The skin may be an open section or a closed section. The skin may contain or hold one or more layers of material comprising the door. The skin may be a box section.

The door may comprise a reflective layer. This layer may be adapted to reflect heat, flame or impact. This layer may be steel or stainless steel.

The reflective layer may be a relatively thin layer. It may occupy between 0.5 and 5% of the thickness of the door. Preferably it occupies between 1 and 3% of the thickness of the door.

The door may comprise a force or impact absorbing layer. This could be a resilient material such as rubber, polymer, plastics material or the like or composite polymer material with additional material embedded in a matrix of the polymer material.

The force absorbing layer may be a relatively thin layer. It may occupy between 5% and 25% of the thickness of the door. Preferably it occupies between 5% and 15% of the thickness of the door.

The door may comprise a resilient layer. The resilient layer may be rubber, polymer, composite, or the like.

The resilient layer may be a relatively thin layer. It may occupy between 5% and 25% of the thickness of the door. Preferably it occupies between 5% and 15% of the thickness of the door.

The door may comprise a support layer. The support layer may be adapted to provide a degree of internal rigidity to the door. Additionally or alternatively it may provide a support layer onto which other layer or layers may be fixed, for example adhered or supported. This layer may be plywood.

The support layer may be a relatively thick layer. It may occupy between 20% and 60% of the thickness of the door. Preferably it occupies between 30% and 50% of the thickness of the door.

The door may comprise a clogging layer. This layer may be adapted to clog the cutting surfaces of cutting tools such as saws used to attack the door. This layer may be plywood, or a polymeric material (such as polycarbonate), or a composite material, or the like.

The clogging layer may be a relatively thick layer. It may occupy between 20% and 60% of the thickness of the door. Preferably it occupies between 30% and 50% of the thickness of the door.

The door may comprise a carbonising layer. This layer is adapted to carbonise under thermal attack to produce an altered layer more resistant to further thermal attack. This layer may be plywood.

The carbonising layer may be a relatively thick layer. It may occupy between 20% and 60% of the thickness of the door. Preferably it occupies between 30% and 50% of the thickness of the door.

The door may comprise a friction layer. The friction layer may provide a surface or layer which is resistive to the regular motion of cutting surfaces. This layer may be plywood, or rubber, or expanded metal, for example that known as "expamet".

Additionally the friction layer may cause wear of cutting surfaces of cutting tools.

The friction layer may be a relatively thick layer. It may occupy between 20% and 60% of the thickness of the door. Preferably it occupies between 30% and 50% of the thickness of the door.

The door may comprise a bulk layer. The bulk layer may provide thickness to the door. The bulk layer may be plywood or rockwool or both.

The bulk layer may be a relatively thick layer. It may occupy up to 95% of the thickness of the door. Preferably it occupies between 30% and 90% of the thickness of the door.

The door may comprise a mobile layer. The mobile layer may be adapted to move relative to one or more other layers of the door. It may be adapted to move en masse or locally. It may be adapted to crumple around a particular region. It may be adapted in use to move in some circumstances perpendicularly to the plane of the door. This may be an expanded metal or mesh layer.

The mobile layer may be of mild steel or aluminium.

The mobile layer may be a relatively thin layer. It may occupy between 5% and 25% of the thickness of the door. Preferably it occupies between 5% and 15% of the thickness of the door.

The door may comprise a stranded layer. This may be a mesh layer. This may be an expanded metal or mesh layer.

The stranded layer may be a relatively thin layer. It may occupy between 5% and 25% of the thickness of the door. Preferably it occupies between 5% and 15% of the thickness of the door.

The door may comprise an insulating layer. The insulating layer may be a heat insulating layer or a sound insulating layer or both. The insulating layer may be rockwool.

The insulating layer may be a relatively thick layer. It may occupy between 20% and 60% of the thickness of the door. Preferably it occupies between 30% and 50% of the thickness of the door.

The door may comprise a low density layer. The term low density may apply when used in comparison to steel.

The low density layer may be a relatively thick layer. It may occupy between 20% and 60% of the thickness of the door. Preferably it occupies between 30% and 50% of the thickness of the door.

The door may comprise a fibrous layer. This layer may be adapted to snag the cutting surfaces of cutting tools.

The fibrous layer may be a relatively thick layer. It may occupy between 20% and 60% of the thickness of the door. Preferably it occupies between 30% and 50% of the thickness of the door.

The door may have a layer of reinforced material which is resistant to attack. Such a reinforced layer may be comprised of a composite material for example polymer material, such as a plastics material Plastechnol is a preferred material.

The reinforced layer may be a relatively thin layer. It may occupy between 5% and 25% of the thickness of the door. Preferably it occupies between 5% and 15% of the thickness of the door.

Preferably the door comprises an in-fill layer. This may be rockwool. The in-fill material may be an insulator. It may be an insulator against heat or sound or both. The in-fill layer may be provided to give thickness to the door. The thicker the door is, the greater is its second moment of area. A greater second moment of area may provide better bend or impact resistance.

The in-fill layer may be a relatively thick layer. It may occupy between 20% and 60% of the thickness of the door. Preferably it occupies between 30% and 50% of the thickness of the door.

Preferably a door according to the invention may comprise a plurality of the layers mentioned in the foregoing (in any combination). One of the layers may serve one or more of the functions disclosed in the foregoing. The door may comprise more than one layer of each kind. Layers of the same kind, or of the same material, may be separated by an intervening layer or layers.

There may be a ceramic, or refractory layer.

In a particularly preferred embodiment of the invention the door comprises a plurality of hard layers in combination with:

a) a carbonising layer, b) a reinforcing layer, and c) an infill layer.

Such a composite door offers particularly good resistance to impact, flame and cutting attacks.

The reinforcement layer may comprise a layer alternately contacting the first and second hard layer. This layer, which may have a corregated profile adds significantly to the strength.

The reinforcing layer is preferably of metal, such as stainless steel. The reinforcing layer is preferably fixed to the first and/or second hard layer, most preferably by welding or adhesives.

A clogging layer may also be provided to further increase cutting resistance.

Further reinforcement or support can be provided by a series of internal structural elements which may be provided as a layer. Rigid metal elements, such as pipes, are particularly preferred. Such elements may be formed of composite materials, such as filled pipes. Cement offers a particularly preferred filling material.

Such elements increase impact, frame and cutting resistance further. The elements may be fixed relative to the door profile or free to move, for example within certain predefined areas. Such movements increases the difficulty of cutting.

One embodiment of the invention provides a door having a first and second steel layer sandwiching a composite formed of plywood, stainless steel, rockwool and an asphalt based material.

Preferably the layers of the door are arranged one in front of another substantially in the plane of the door in between the front and rear hard surfaces. It is preferred to have the force or impact absorbing layer towards the front (attack face) of the door. The in-fill layer may be towards the rear of the door. The support and/or reinforcing layer may be sandwiched between two of the other layers. The stranded or mobile layer may be sandwiched between two of the other layers. The stranded or mobile layer may be adjacent to the in-fill layer. The stranded or mobile layer may be movable relative to the in-fill layer when put under attack.

Whilst substantially planar layers are envisaged the layers may be discontinuous only extending over a portion of the door, or having varying thicknesses to the layers, or having a non planar profile. Such structures all offer the composite benefits of the present invention.

One or more strengthening members may be provided along one or more of the edges of the door. Preferably pairs of strengthening members are provided running along opposite edges of the door. Strengthening members may run vertically up the vertical edges of the door or horizontally across the horizontal edges of the door or both. It is preferred to have a strengthening member running up either vertical edge of the door.

The strengthening members may be located within the skin of the door. Alternatively these strengthening members may be outside of the skin of the door. The strengthening members may be located partially within and partially outside of the skin of the door.

Preferably the strengthening members provide at least one surface to resist against attack. This may be a surface which runs parallel to the front of the door, or the edge of the door. Preferably attack resistant surfaces are provided which run substantially parallel both to the front and to the edges of the door. The one or more strengthening members may be L-shaped in cross section. They may be comprised of rolled steel angle. Alternatively, the strengthening members may be C-shaped in cross section.

A frame may also be provided to accompany the door and provide further support.

Preferably the frame is defined by a plurality of elements. The side elements, hinge and strike sides, are preferably formed of hollow sections which can be fastened to the walls forming the aperture.

Preferably one or more plates can be inserted between the side elements and the walls to provide adjustability.

Preferably a further element is provided extending between the side element and wall and protruding beyond the edge of the side element and around its edge. Antiprising protection can thus be provided.

Preferably the side element is provided with a recess to receive the door, most preferably into a substantially flush position. An additional recess, outward of the first, may be provided to receive an anti-prise protecting flange on the doors edge.

The means for fastening the side element to the wall may be provided within the hollow element. Access may be obtained, to tighten and release the fastening, through an aperture in the external wall of the element.

The base and/or top elements may comprise an element with a protruding portion defining a recess to receive the door. Most preferably the outer edge of the door is received in a position flush with the outer edge of the base/top element.

A support element may be provided between the base/top element and the wall/floor to strengthen and support it. Most preferably the support element is provided extending in to the protruding portion. It is particularly preferred that the protruding portion receive the base/top element to wall fastener. Preferably the fastener also passes through the support element. A U-shaped support element is preferred.

According to a second aspect of the invention we provide a method of increasing the time it takes to gain entry to a space behind a door comprising the step of providing the door with a plurality of layers of materials including one or more of the following: a reflective layer; a hard layer; a force or impact absorbing layer; a resilient layer; a support layer; a clogging layer; a carbonising layer; a friction layer; a bulk layer; a mobile layer; a stranded layer; a thermal layer; a low density layer; or a fibrous layer.

The door may be provided with more than one layer of each kind.

Preferably the door is provided with two or more layers. The door may be provided with three, four, five, six, seven or more layers.

The door may have any combination of said layers, in any order.

The invention could be seen as the use of a composite door, as detailed in the first or second aspect, to increase the time taken to gain entry to the space on the other side of the door, or to increase the security of such a door.

According to a third aspect of the invention we provide a method of strengthening a door comprising the step of incorporating one or more layers of a foregoing aspect of the invention into the door.

According to a fourth aspect the invention comprises the use of one or more layers of the second aspect of the invention in order to produce a door which is resistant to attack.

In all of the foregoing the term door is also meant to include a panel for a door. Therefore the invention may provide a panel which can be fitted to a door to improve its security. Such a panel could even be used as a panel for a wall, roof or simply a part of a building. Preferably the door of any aspect of the invention is a security door. Alternatively it may be a door for a safe, a cupboard, a box, a vehicle or in any other attack resistant door application.

The term layer does not necessarily mean material which extends the full height or weight or both of a door. Adjacent "layers" may simply overlap.

In a door according to the invention, a plurality of materials are used. Each of the materials has a particular advantage in defending against a particular attack mode. A skin of steel or stainless steel can reflect heat attack, for example by an oxyacetylene cutting torch. Under thermal attack a wood layer can carbonise and thus resist further attack. A resilient layer can "pinch" a cutting tool and increase friction encountered by the cutting tool. An in-fill layer may be fibrous and may serve to snag cutting tools which are used to attack the door. A stranded or expanded metal layer may be capable of collapsing around a region of particular attack, for example cutting. Alternatively an expanded metal layer may be capable of moving substantially perpendicular to the plane of the door. Such movement may absorb energy.

In such a construction, if an intruder seeks to break through the door, and he uses one particular mode of attack on the door, different layers in the door will resist the attack in different ways. Having a plurality of layers means that an intruder is encountering a variety of different problems in seeking to break through the door. This will make breaking through the door more difficult. There will be no ideal tool to cut through the door because there is not just one type of material.

Embodiments of the invention are described below by way of example only with reference to the drawings in which.

A door according to the invention may be double or single leaf.

Figure 1:
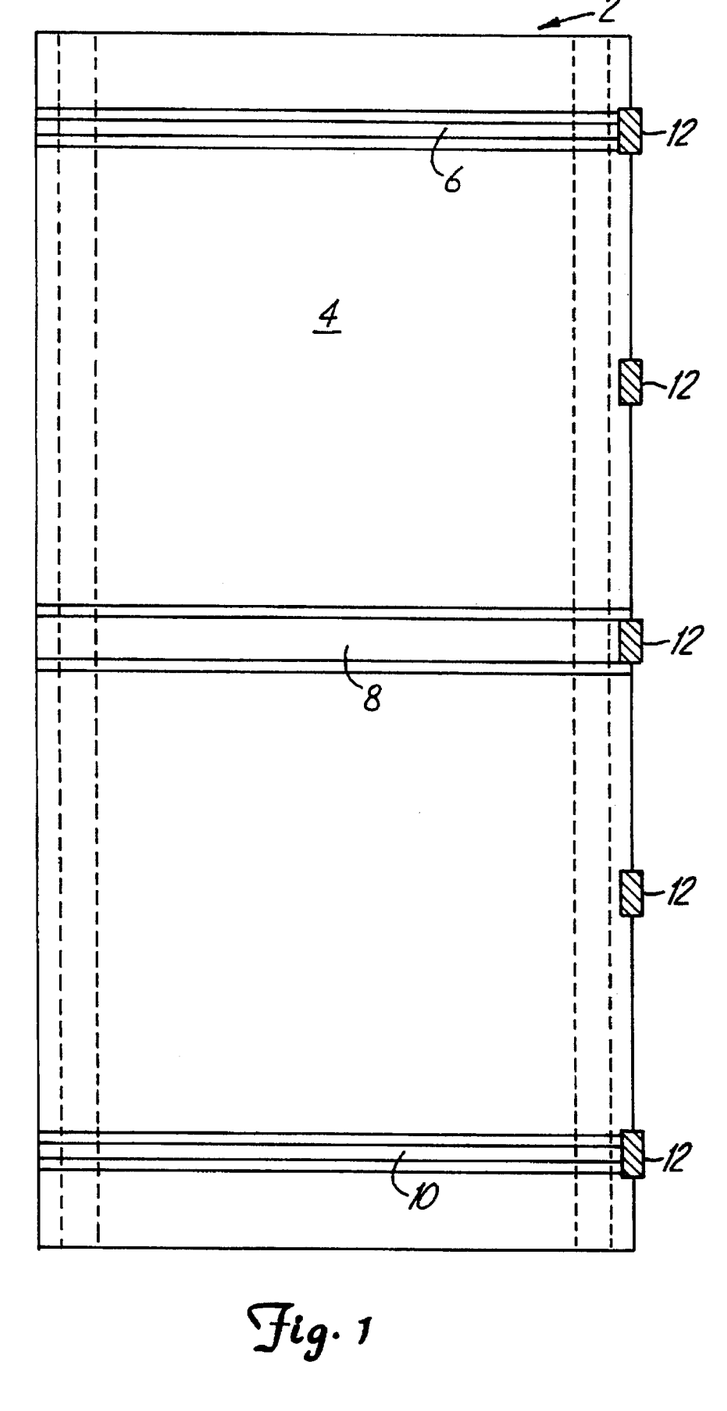
FIG. 1 shows a rear view of a door according to a first embodiment of the invention.

FIG. 1 shows a security door 2 comprising a door body 4 and lateral strengthening bars 6, 8 and 10. Five separate hinges 12 are disposed along one edge of the door. A lock would be provided on the opposing edge of the door but is not shown in this Figure.

Figure 2:
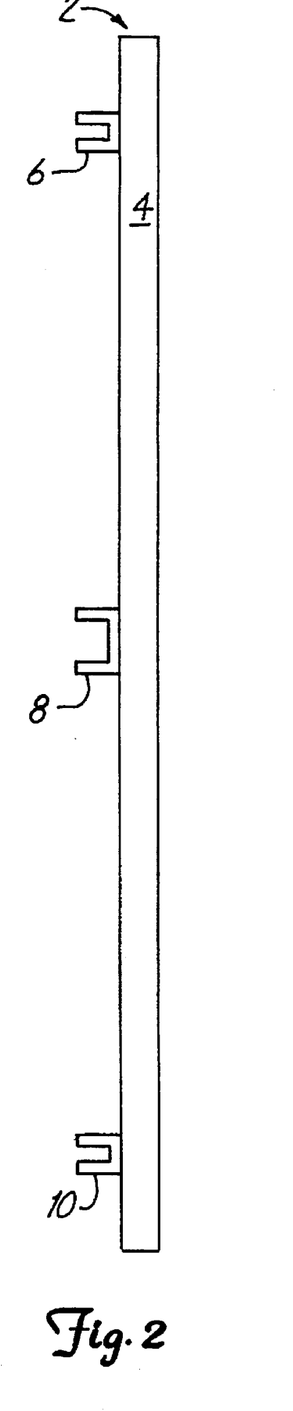
FIG. 2 shows a side view of the door of FIG. 1.

The strengthening bars are C-shaped in cross section as is shown in FIG. 2. The bridging middle part of each of the C-shaped bars is fixed to the door. The bars could be fixed by mechanical means, for example screws or bolts, but it is preferred for the bars to be welded to the rear surface of the door. Bars 6 and 10 are identical in cross section, and bar 8 is similar except that the bridging middle portion of the C-shape of bar 8 is longer.

Figure 3:
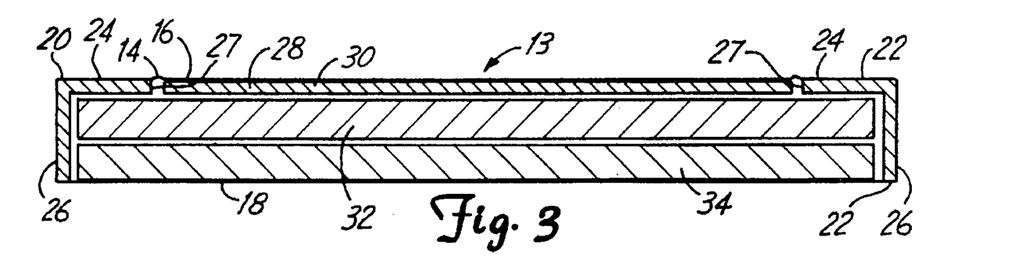
FIG. 3 shows a cross sectional view through the door of FIG. 1 and FIG. 2.
Figure 4:
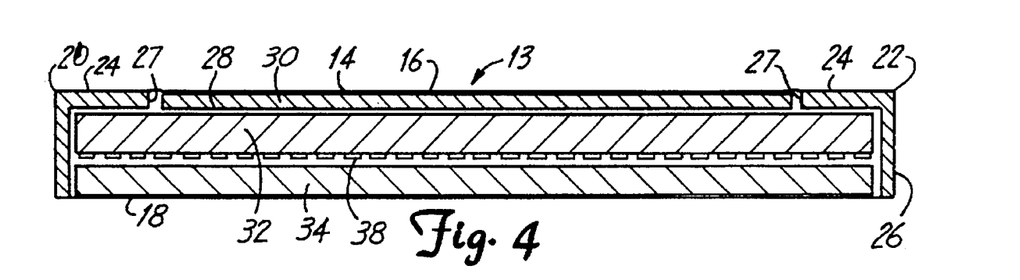
FIG. 4 shows a cross sectional view of a different embodiment of a door according to the invention.
Figure 5:
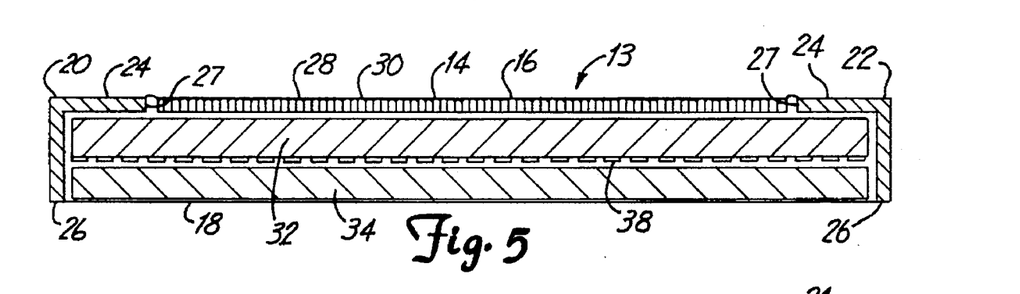
FIG. 5 shows a cross sectional view of a further embodiment of a door according to the invention.

A cross sectional view of doors according to the invention is shown in FIGS. 3 to 6. FIGS. 3, 4, and 5 are very similar and show doors having a similar construction but constructed of varying materials.

FIG. 3 shows a door 13. The door 13 comprises a door leaf 14 having a front sheet 16 and a rear sheet 18. Sheets 16 and 18 are joined together at their edges by side elements 19. Together the sheets 16 and 18 and side elements 19 comprise an elongate hollow box section 21. The sheets 16 and 18 and side elements 19 are made of 1.2 mm electro zinc plated mild steel.

Strengthening members 20 and 22 are present along each edge of the door. The members 20 and 22 run from the top of the door to the bottom of the door. Each member is L-shaped in cross section having a first flange 24 which is parallel to the front attack face 16 of the door and a second flange 26 perpendicular to the first which is perpendicular to the edge of the door. The strengthening members may be fixed to the front sheet 16 and the edge of the door 2.

The members 20 and 22 provide protection against prising the side of the door away from the frame surrounding it, for example by a crowbar. The members are made of rolled steel angle, for example 40×40×5 mm RSA.

The leading edges 27 of the first flanges 24 at the front of the door are separated and form a gap 28. A force or impact absorbing layer 30 is present behind the front sheet 16 and between the leading edges 27 of the flanges 24 and 26. This layer 30 could be a composite material and in this example is a nylon reinforced rubber of appropriate thickness, for example 6 mm. Other impact absorbing layers could be provided, but in this example are not.

Behind the force absorbing layer 30 is a structural support layer 32. The structural layer 32 provides structural support to the box section 21 and layers of material in the door 13. It also provides a degree of protection against physical or thermal attack. In this embodiment the structural layer 32 is a 25 mm thick layer of plywood.

Layers of adhesive are present at the interfaces between the front face 16 and the impact absorbing layer 30 and at the interface between the impact absorbing layer 30 and the structural layer 32.

A third layer is present, disposed towards the rear of the door 13 adjacent to the rear sheet 18. This is an in-fill layer 34 which may be comprised of a suitable material, for example rockwool. The in-fill layer 34 serves several purposes: it adds to the thickness of the door 13 to hinder an intruder penetrating all of the way through the door; it is a lightweight layer which reduces the weight of the door; it is a layer of thermal insulation to protect against thermal attack; and it is a fibrous layer which can snag the blades of cutting tools which may be used on the door.

The overall intention of the invention is that in attempting to generate an aperture, in any part of the door, which is useful to someone seeking unauthorised access, that a number of different materials and problems are encountered. Thus in this case a hard material (steel), impact absorbing material (rubber) structural/carbonising material (plywood) and infill/insulating/fibrous material (rockwool) are encountered. Thus resistance to cutting frame and impact tools is provided.

To be useful to the unauthorised person an aperture some 40 cm by 30 cm needs to be created. In this regard the USA LPS (Loss Prevention Standard) 1175 issue 2 specifies an aperture sufficient to pass certain standard blocks through, section 7.5, the blocks being either a) rectangular cross-section, 40 cm×30 cm with a 1 cm corner radius, b) a 40 cm diameter circular or cross-section or, c) an elliptic cross section major axis 40 cm, minor 30 cm.

In creating apertures of such size clearly all the materials are encountered and the composite properties are invoked.

Thus even where part of the cut only goes through the very end portion 22 and hence meets one material other portions of the cut engage the other materials.

FIG. 4 shows a cross section of a security door 36 which is very similar to the embodiment shown in FIG. 3. Corresponding reference numerals have been applied to corresponding features of the door 36. The major difference in the door 36 of FIG. 4 is that an extra layer of material 38 is provided in the door 36 between the layer of rockwool and plywood.

The extra layer 38 is a layer of stainless steel expanded metal (expamet). This is a metal mesh formed by drawing a slotted piece of steel. Other mesh materials (not necessarily of metal) may be provided instead of an expamet layer. Mild steel is a preferred material.

The presence of an expamet or mesh layer may convey several advantages. If a physical attack is made upon the door 36 with a cutting tool, the extra layer 38 may vibrate in response to the cutting force applied. This can absorb energy and can also encourage the cutting tool to bounce off the extra layer 38. Since the extra layer 38 is not anchored with respect to the door leaf or to layers in the door, it can move back and forth in response to a cutting force applied. The nature of the rockwool layer also assists in this bouncing effect—the rockwool has some resilience: it is not a hard layer. Furthermore, since the extra layer 38 is not anchored, under the duress of a severe physical attack the extra layer 38 can collapse in upon itself at the point of attack and snag a cutting tool being used on the door 36. Mild steel is better for this task than, say, stainless steel since it is more ductile. This property enhances the grabbing and snagging of the cutting tool. It is surprising that mild steel (an inexpensive material) is better for the task than stainless steel which is more expensive.

FIG. 5 shows an embodiment of a door 40 which is very similar to the embodiment of FIG. 3 and particularly similar to the embodiment of FIG. 4. Corresponding reference numerals will be applied to corresponding features of this Figure. The door 40 has a structural layer 32, an in-fill layer 34 and an extra layer 38, for example mesh or expamet. The force absorbing layer 30 provided towards the front sheet 16 of the door is comprised of an impact resisting layer for example a textile bonding material, a composite material, plastechnol or any suitable material.

Figure 6:
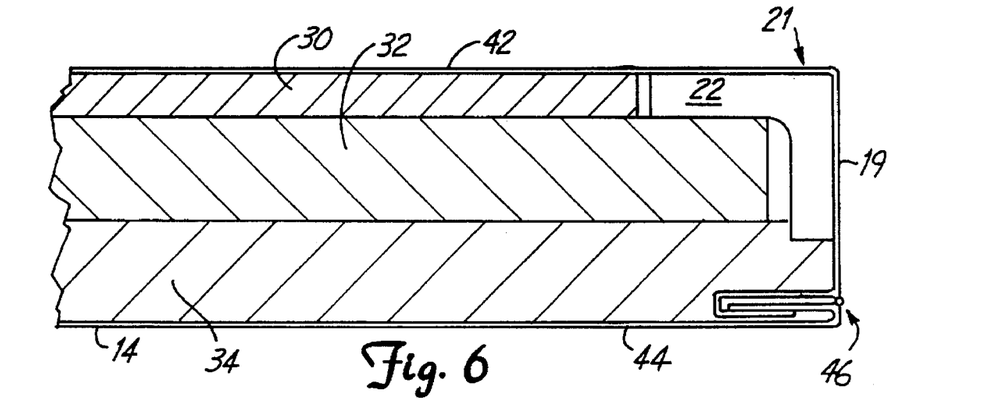
FIG. 6 shows a fragmentary view of a cross sectional view of another door according to the invention.

FIG. 6 shows a fragment of a cross section of a door having a construction which is applicable to any of the doors shown in the preceding Figures.

The layers 30, 32 and 34 are present within the hollow box section 21 of the door. A strengthening member 22 is shown at one side of the door. As can be seen from this Figure, the hollow box section 21 comprises a front section 42 and a rear section 44 joined together with a vertical interlock seam joint 46. This would usually be welded.

Figure 7:
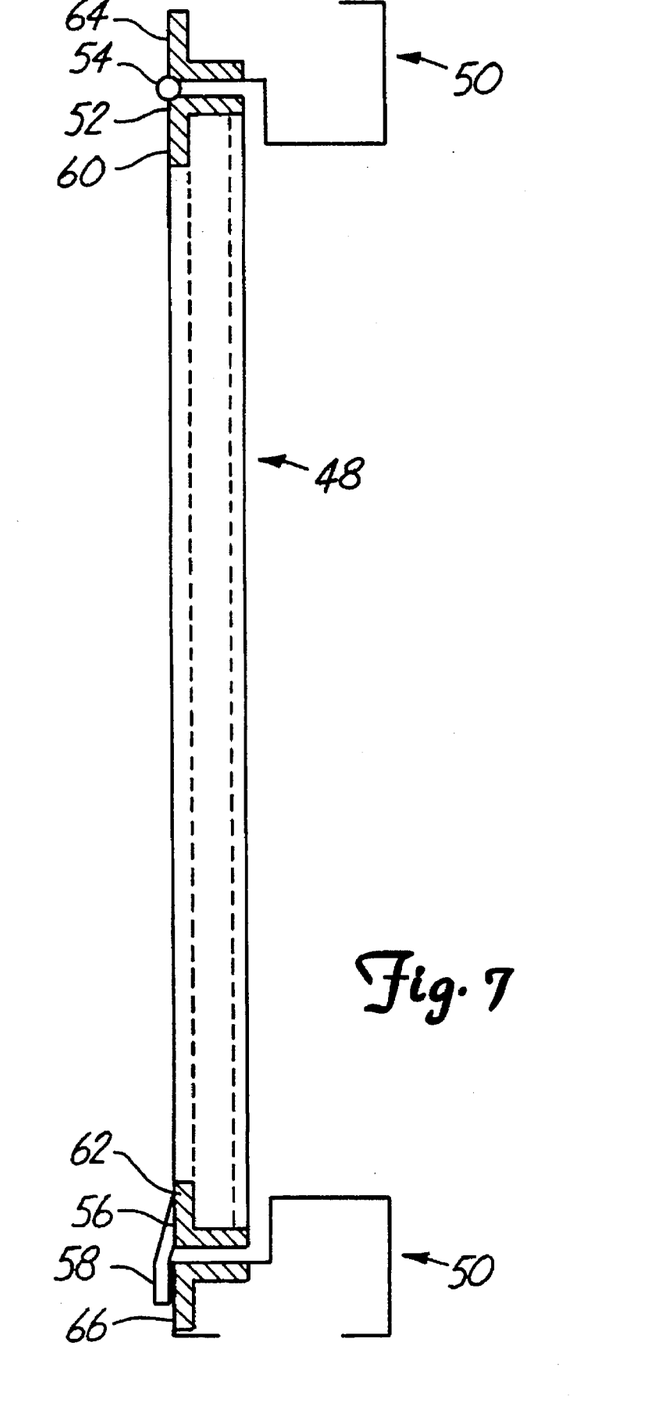
FIG. 7 shows a view from above of a cross-section of a door according to the invention installed in a frame.

FIG. 7 shows a view from above of a cross-section of a door according to the invention installed within a frame 50. The door 48 is pivotally mounted on the frame 50 on one edge 52 by means of a series of hinges 54. On the other edge 56 of the frame 50 is a locking mechanism 58 to lock the door 48 against the frame 50.

The door 48 is provided with strengthening members 60 and 62 as described above. Corresponding strengthening members 64 and 66 are provided inside the vertically depending members of the frame 50 on either side of the door 48. All of the strengthening members 60, 62, 64 and 66 present one flange outwardly lying in the plane of the attack face of the door and pairs of members 60 and 64 and 62 and 66 have opposing flanges facing each other between the door 48 and the frame 50. This arrangement of strengthening members provides anti-prise protection for the door. Furthermore the strengthening members can support hinges and the door locking mechanism or mechanisms.

In a conventional security door, there is simply a thick bulk material, for example wood, clad in relatively thin steel. In order to provide a decent thickness of door, for example around 50 mm, to increase the time required to cut through the door, the thickness of the wood results in a very heavy door.

By omitting some or all of the wood layer by using other materials, for example rockwool, the weight of the door may be reduced.

Alternatively, the door can be made much thicker and still be within suitable weight constraints. If a door is sufficiently thick, certain cutting tools may be unable to penetrate all of the way through the door which can make cutting a person-sized hole in the door more time consuming.

If a door according to the embodiment of FIG. 3 is attacked with a hammer and chisel, in attempting to drive the chisel through the door, the chisel penetrates the front sheet relatively easily. Once the chisel is penetrating the rubber layer the rubber grips or pinches the sides of the chisel and may absorb some of the driving force driving the chisel into the door, and thus slows down the time for the chisel to penetrate the door.

The plywood layer presents a very difficult layer through which to drive a chisel.

If this door is attacked with a cutting torch, the torch may cut easily through the front sheet of the door. If the torch cuts through the rubber layer, the torch reaches the plywood layer. This layer may carbonise readily producing a combustion product which can resist further thermal attack.

Figure 8:
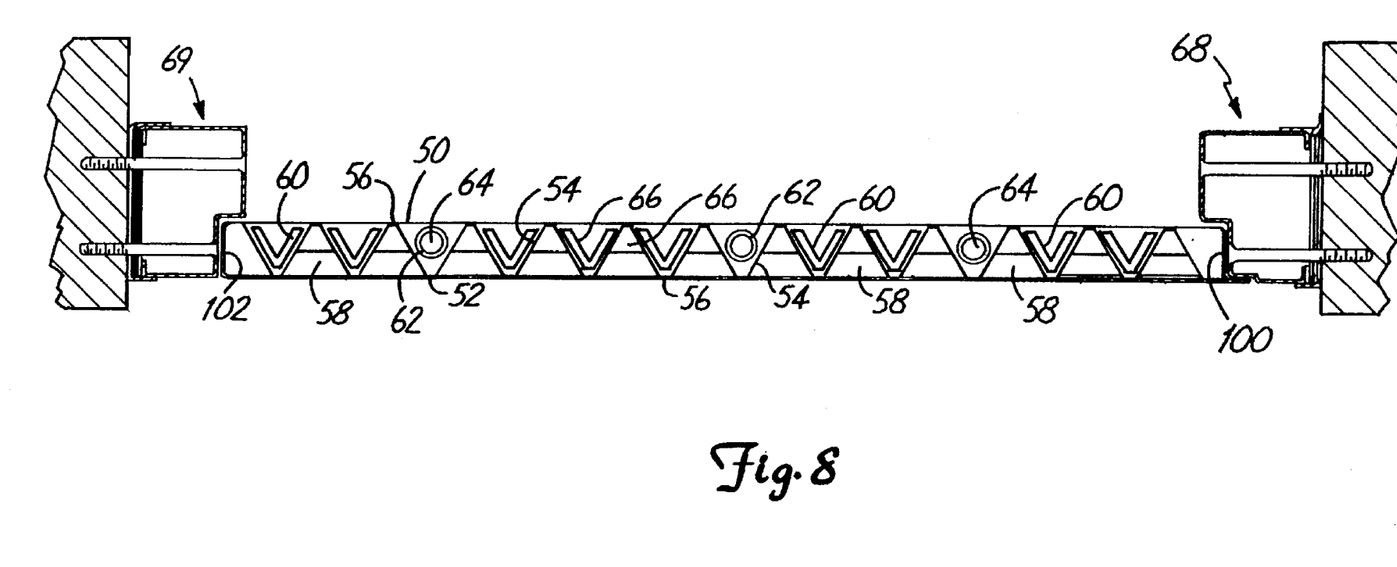
FIG. 8 shows a cross sectional view through a further embodiment of a door, according to the invention, including the frame.

In an alternative embodiment of the invention instead of planar layers the layers are employed in a different manner. FIG. 8 illustrates a cross section through a door of this type.

Hard skin layers 50,52 of steel are provided sandwiching the other layers of the composite door.

Typical skin thicknesses are 2.0 mm with the skin portions typically welded to each other at the ends, portions 100 on the strike side, portions 102 on the hinge side, to provide a firm structure.

A reinforcing layer 54 having a corrugated profile alternately abuts the front and rear skin layers 50,52, respectively. At the junction portions 56, typical 7/16", the layer 54 is welded to the skin layers 50,52 to further increase strength and support. An angle of 60° is typical for the intervening portions.

Stainless steel is a preferred material for this reinforcement as it can be welded to the skins and also offers effective resistance to flame attack.

Attachment of the reinforcement to the skins over 3" vertically and 2.75" horizontally is desirable. 28 gauge, 0.4 mm, material is typically employed.

Further layers within the composite are provided by a plywood layer 58 provided in blocks within the trapicoidal profile defined by the reinforcing layer 54. This plywood layer, typically ¾" thick, carbonises under flame attack and so resists penetration. The cutting speeds of abrasive dish cutters are also reduced. The plywood is provided in the attack side of the door.

To resist cutting attack a clogging layer is provided by asphalt shingle material 60 which again is provided within the profile defined by the reinforcing layer 54. Alternative gumming/clogging materials may be employed. Fiberous materials also offer the potential to reduce cutting tool effectiveness.

Further reinforcement is provided by a layer of pipe elements 62 arranged at discrete locations within the door. By filling these pipes, typically 1" of diameter, with concrete 64 cutting and flame resistance is again increased.

The remaining space in the composite is taken up by a layer of infill material 66, such as rockwool, which extends along the rear of the door.

This composite structure and the various layers of material involved achieves the same type of results as the planar layer previously discussed. In generating an aperture of a useful size, ie 40 cm by 30 cm, all the materials of the composite are encountered at some stage and all the problems of getting through them are consequently involved.

Figure 9:
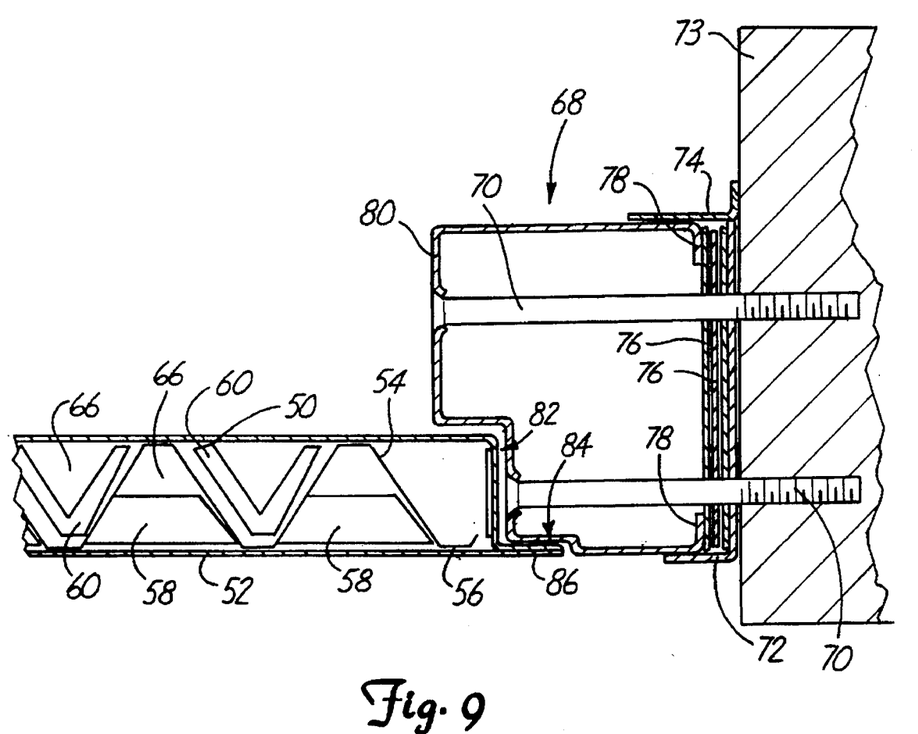
FIG. 9 shows a detail from FIG. 8 of the strike jamb.
Figure 10:
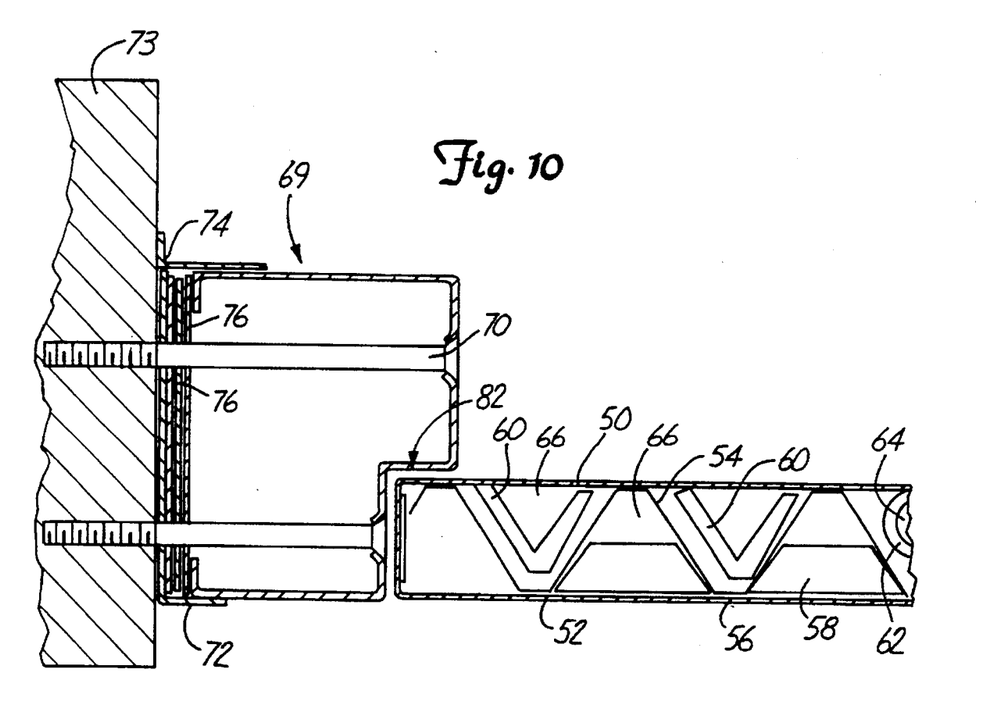
FIG. 10 shows a detail from FIG. 8 of the hinge jamb.

As can be seen in FIG. 8, and more clearly in FIGS. 9 and 10 the door in its closed state abuts strike 68 and hinge 69 jambs which extend behind the door to provide support.

The strike jamb is fastened to the aperture defining wall 73 by fixings 70 comprising flat head bolts, which are recess into the jamb. The jamb is formed by a roughback 72 with an overlapping edge to resist prying attack. A plate 74 is also provided as fixed on the rear side. Steel shims 76 provide support for abutment faces 78 on the jamb element 80 and allow aperture size adjustment. The jamb element 80 also has a recess 82 to accommodate the door and strengthen against attempts to force the door.

In addition to the door accommodating recess 82 a further recess 84 is provided which accepts a flange 86 of the door and protects the lock mechanism.

Further protection for the lock can be provided by additional localised metal plates between the mechanism and the attached side.

The hinge jambs, FIG. 10, are of similar construction with a roughback 72, shims 76, trim 74 and bolts 71.

The hinges themselves are typically fastened to the door and frame by shear resisting studs which engage the reinforcing in the door and frame. Four such hinges are typical for an average door.

The provision of suitable electronic contacts to determine the state of the door; open or closed; lock or unlock; quiet or under attack is envisaged.

Figure 11:
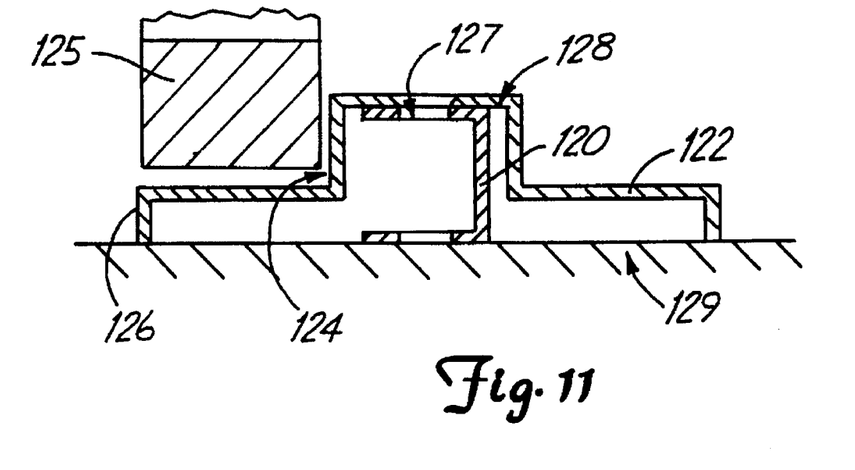
FIG. 11 shows a cross-section through a sill element.

As illustrated in FIG. 11 the top and bottom sills for the door frame typically consist of a "chair" element 120 over which a plate element 122 is placed. The plate 122 is recessed, 124, to accommodate the door 125. The outside of the door is flush with the plate end 126. A fixing bolt passes through apertures 127 in the top 128 of the plate 122 and chair 120 to fix it in position to the floor 129. The chair 120 aids in supporting the plate 122.

Figure 12:
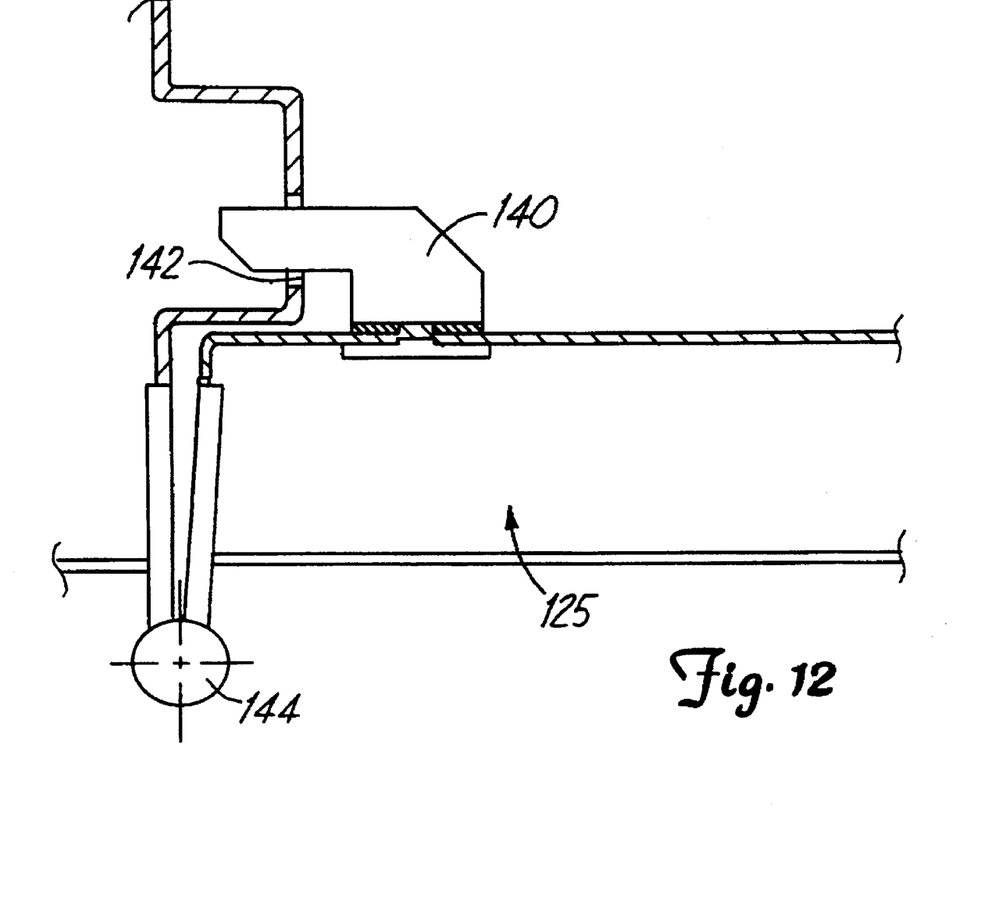
FIG. 12 shows a detail of a security catch area.

As illustrated in FIG. 12 the rear of the door also has security "dogs" bolted to it. These stainless steel catches 140 engage holes 142 in the Jamb 69 when the door is closed. Thus even if the hinges are successfully attacked and removed the door cannot be removed.

If desired bullet piercing resistance for the door can be provided by inserting shallow V or gull wing profile sections into the interior of the door.

Figure 13:
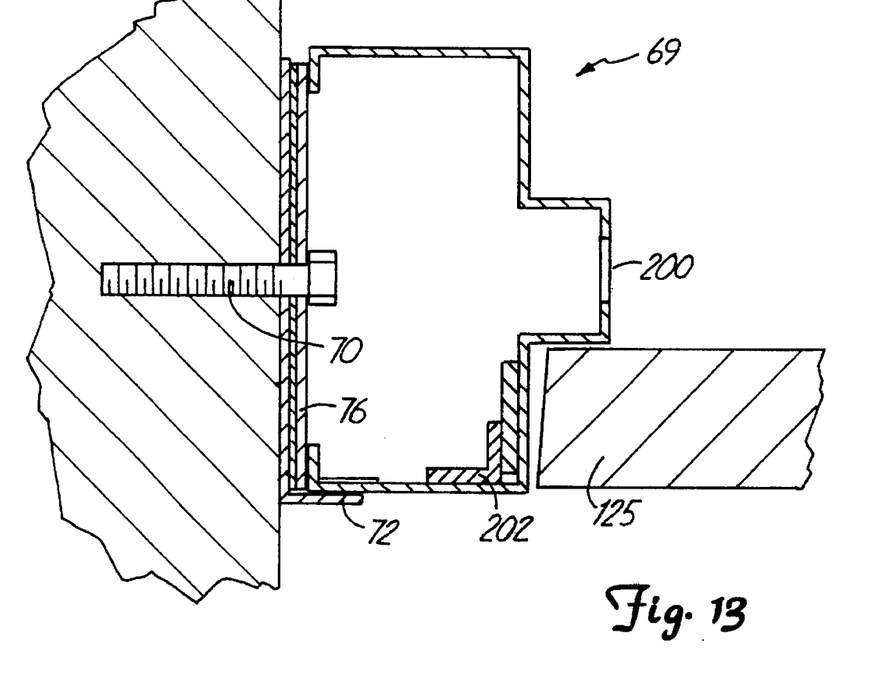
FIG. 13 shows an alternative jamb fixing.

As an alternative fastening for the jambs an access hole 200 can be provided, FIG. 13, leading to a bolt within the Jamb frame. The structure is otherwise consistent with the earlier Jambs.

Additional reinforcing angles 202 can be provided on the attack side to resist Jamb deformation under prying attack.

Figure 14:
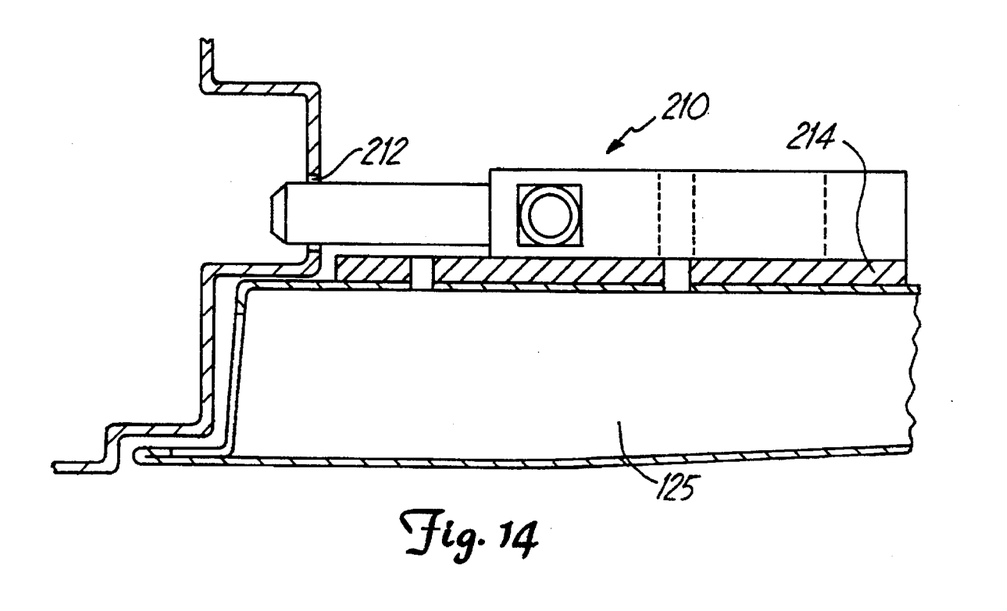
FIG. 14 shows a bolt area.

As illustrated in FIG. 14 the bolts 210 on the rear of the door engage with an aperture 212 in the Jamb at the full width portion. The bolts 210 are conveniently mounted on a shin 214 attached to the rear skin of the door.

Figure 15:
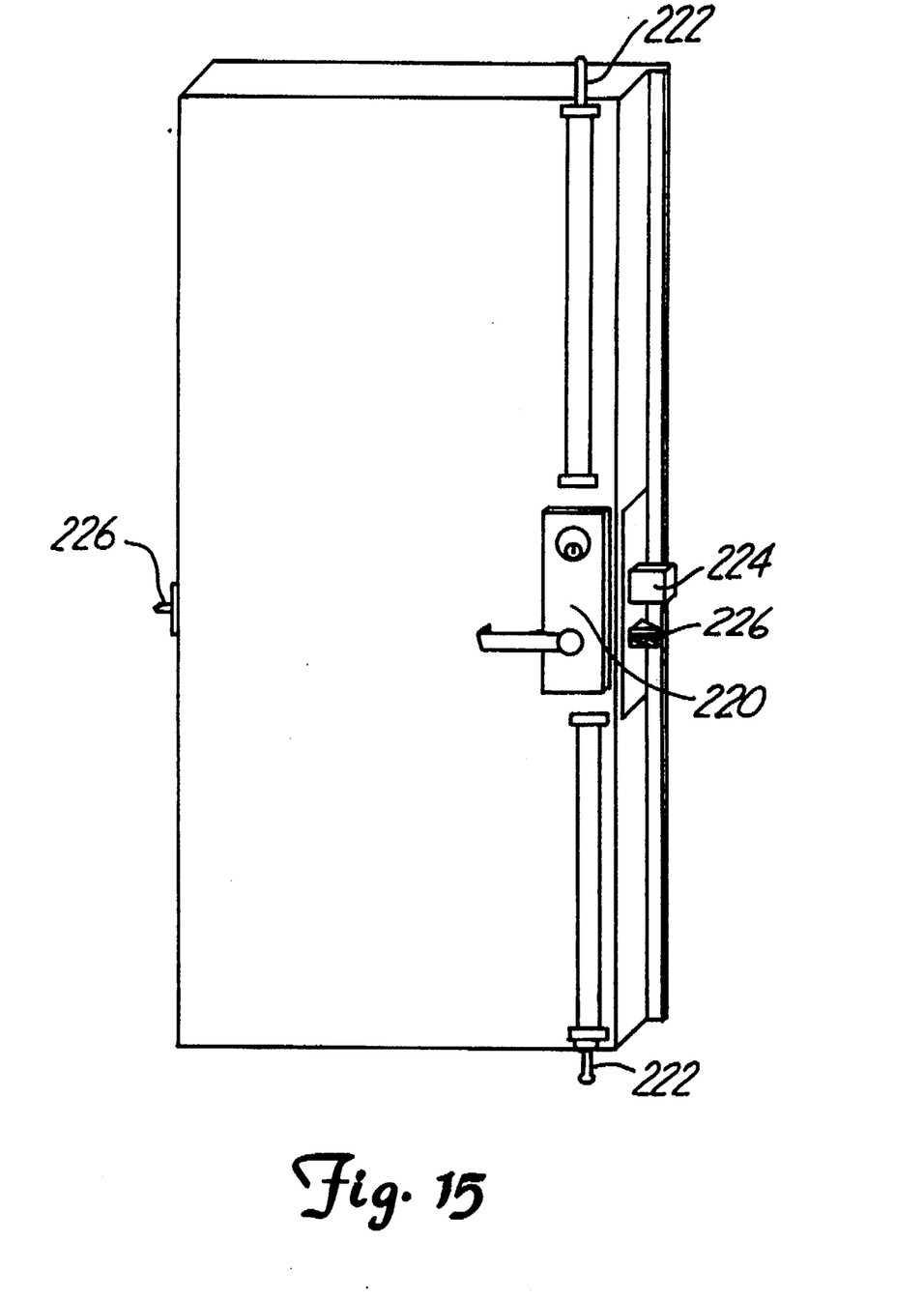
FIG. 15 shows a perspective view of a lockset.

FIG. 15 illustrate a rear perspective view of a locking arrangement which can be employed. The lever handle unit 220 controls dead bolts 222 engaging the frame top and bottom and a mortice lock 224 for engaging the side. Contacts 226 indicate the state of the door to electronic monitors.

Top, bottom and side frames are bolted together using suitable bracket arrangements.

As an example of the security of doors according to this invention an example subjected to a number of tests is now detailed.

Secret tests carried out on the door design were as follows; the attacks using a gasoline powered cutoff saw equipped with a 12" steel cutting blade; and oxy-acctylene torch; and a 220 v plasma cutting torch. In each case, attack tools also included a five pound (2.2 kg) hammer; an eight (3.5 kg) sledge; crowbars and chisels.

Time to penetrate and produce an opening of 9" by 16" (225 mm×400 mm) completely through the door was as follows:

| | |
|---|---|
| Disk cutter | 14 minutes + |
| Oxy Acctylene | 22 minutes + |
| Plasma Cutter | 18 minutes + |

The Panels

A test panel of the structure of FIG. 8 was prepared the layers consisting of

Plywood—¾" (19 mm) in face flutes

Three galvanized 1" pipes filled with cement in rear flutes

Stainless steel (304) 28 g reinforcing

Panel weight was 55 kg/m²

Time to Penetrate for Different Materials

| | Cutter | OxyAcctylene | Plasma |
|---|---|---|---|
| Time to cut through 14 g front face | 4:55 | 3:55 | 3:26 |

-continued

Time to Penetrate for Different Materials

| | Cutter | OxyAcctylene | Plasma |
|---|---|---|---|
| Time to remove plywood | 2:45 (cut w/disk) | 5:08 (burn & pry) | 3:30 (pry and break) |
| Effect of Stainless Core | Rapid disk wear | 5:00 (wouldn't cut-had to burn) | Minimal Add'l as compared to mild steel |
| Effect of Pipe Reinforcing | Rapid disk wear | About 2 min per pipe (two cuts) | About 1 min/ pipe (one cut bend & remove |
| Total Time | 14:10 | 22:00 | 18.35 |
| Condition at end of time | (1) | (2) | (3) |

(1) No actual opening. Grinder diameter was so reduced (to 7.5") that complete the last few inches of cutting the back skin.
(2) Only one of the three pipes was actually cut. The other two were removed from the end of the panel, which would not have been possible in an actual door. Without that omission, actual time would have been about 20 minutes.
(3) A full hole was completed. Bending and removal of the short pipes provided in the sample panel would have been more difficult in an actual door.

For all three attacks, actual passage through the door would have been very difficult, since the edges were very ragged, and the rest of the panel remained intact and very rigid.

The Attacker

Doors were attacked by Bill Reno, an experienced door fabrication employee. Reno is approximately 6'2" tall, weights about 210 lb, and attacked the panels very vigorously.

Summaries of the attack methods and times follow.

Cutting Attack

Attack on 36"×36" test panel using Stihl Abrasive cutter, gasoline powered, Model TS 360 AV, driving a 12", new steel cutting abrasive disk blade

| Time | |
|---|---|
| 00:00 | Begin a vertical cut |
| 00:24 | Through front skin w/9" vert cut |
| 00:40 | Cut pierces back skin |
| 00:49 | Begin 1st horizontal cut |
| 01:59 | Horizontal cut through first skin, begin 2nd horiz cut, wheel diameter dropping |
| 03:20 | 2nd horizontal cut through first skin, begin 2nd vertical cut |
| 03:57 | Cuts through face complete, begin bashing and ripping face off |
| 04:55 | Face removed, cutting plywood with disk cutter |
| 06:56 | One cut through ply complete, begin second cut |
| 07:40 | Plywood removed, attack core |
| 09:02 | Core partly removed, encounter pipes, attempting to cut through backside |
| 09:50 | One horizontal cut through back skin complete begin a vert cut |
| 10:15 | One vertical cut complete |
| 11:02 | 2nd vertical cut complete, attempt another horizontal cut. Blade diameter dramatically reduced Begin smashing back to remove |
| 11:30 | Additional cutting horizontal |
| 11:45 | More bashing |
| 12:16 | Cutting again |
| 14:10 | Additional cutting, grinder no longer has enough diameter to permit cutting on the back |

| Time | |
|---|---|
| | skin, just won't reach. Still no hole through the door. Test stopped. |

In order to penetrate the door with this machine, the attacker would have had to change blades, consuming another five minutes, plus subsequent cutting time. Total time to cut the hole would have been well over 15 minutes.

At the conclusion, the diameter of the cutting blade was only 7.5".

Oxyacetylene Attack

Attack using an OxyAcetylene Torch, along with an array of hammers, chisels and bars.

| Time | |
|---|---|
| 00:00 | Begin a vertical cut |
| 00:28 | Vert complete, begin horizontal through front face |
| 01:30 | 1st horiz complete through face, being 2nd vert |
| 01:48 | 2nd vert complete, begin 2nd horiz |
| 02:34 | face cuts complete, begin prying skin off core |
| 03:40 | More cutting to remove face |
| 03:55 | Face removed, attacking plywood |
| 09:03 | Burning and prying of plywood completed, removed being attempting to cut core |
| 10:39 | Burning and cutting core, attempting to pry it out of the way. |
| 14:40 | Still attacking core. Two of pipes fall through bottom of panel, which was elevated for attack. No end channel, so heat of attack burned of tape holding these into the panel. (this could not happen in a real door). |
| 15:40 | Begin cutting pipes and back skin, prying core out of the way. Two pipes fall through bottom of sample panel. |
| 18:43 | Vertical cut, back skin |
| 19:50 | Begin cutting third pipe |
| 21:55 | pipe removed |
| 22:00 | Back skin smashed out of the way. Hole open. |

The two pipes fell out simple fell through the bottom of the panel tested which, unlike a door, was not equipped with bottom closer channels. The ends of the panels were simply closed with duct tape, which burned due to the heat of the torch. Had they remained in place, total time would have exceeded 25 minutes, based on the time required to remove the last pipe.

Plasma Cutter Attack

Attack on 36" by 36" panel using a 229 volt industrial plasma cutter, along with an array of hammers, chisels and bars. Machine used was a Thermal Arc Pak, 5XR, 22 v, single phase, 42/40 amps.

| Time | Event |
|---|---|
| 00:00 | Begin horizontal cut on face |
| 00:35 | Begin vertical cut |
| 00:51 | Start horizontal cut |
| 01:31 | Start second vertical |
| 02:02 | Begin attempting to pry face loose from core, using hammer and bars. |
| 03:26 | Face removed, commence plywood attack |
| 06:56 | Plywood removed with prying technique Begin vertical cut, back skin. |
| 07:15 | Vertical cut through, being horiz cutting |
| 08:59 | Cutting horizontally intermittently on core flats, bashing core to facilitate cutting |
| 15:38 | This cutting complete, attempt to bash out back, fail, more cutting, then bash out back. |
| 16:56 | Pipe 1 bent out and removed, begin pipe 2 |
| 17:50 | Begin on pipe 3 |
| 18:35 | Opening in test panel complete. |

Note:
Removal of pipe sections was facilitated due to short length used in test panel. Longer pipe sections would have entailed more difficult removal.

We claim:

1. A door comprising:
a first metal layer;
a second metal layer spaced from said first metal layer;
an organic carbonizing layer disposed between said first and second layers, said organic carbonizing layer comprising organic material adapted to burn under thermal attack to produce carbonized material that is difficult to burn further; and
reinforcing means, said reinforcing means comprising a plurality of reinforcing sheet members fixedly attached to said first metal layer and to said second metal layer and extending transversely from said first metal layer to said second metal layer, and said reinforcing sheet members defining a plurality of pockets therebetween, and further said carbonizing layer provided in at least one said pocket.

2. The door according to claim 1, wherein said reinforcing sheet members comprise portions of a corrugated sheet which alternately contacts and is fixedly attached to said first and said second metal layers.

3. The door according to claim 1, wherein further reinforcement or support is provided by at least one pipe having an inside diameter substantially filled with a filling material, said at least one pipe provided in at least one said pocket.

4. The door according to claim 3, wherein said filling material is cement.

5. The door according to claim 1, wherein said reinforcing sheet members are made of stainless steel.

6. The door according to claim 1, wherein said door further comprises a composite layer formed of plywood and stainless steel and said first metal layer and said second metal layer are formed of steel, said composite layer being disposed between said first metal layer and said second metal layer.

7. The door according to claim 1, wherein at least one of said layers is discontinuous, only extending over a portion of said door.

8. The door according to claim 1, wherein said door has a plurality of edges and further comprises at least one strengthening member, said at least one strengthening member being provided along at least one of said edges.

9. The door according to claim 1, in which said carbonizing layer includes wood.

10. A door comprising a first and second hard layer in combination with a carbonizing layer, a reinforcing layer and a further layer, said carbonizing layer including a material adapted to burn under thermal attack to an altered state that is resistant to further thermal attack, said reinforcing layer comprising a sheet of corrugated metal having a plurality of corrugations, said carbonizing layer being disposed between said corrugations of said reinforcing layer, and said further layer comprising a plurality of pipes filled with cement.

11. The door according to claim 10, wherein said reinforcing layer alternately contacts said first hard layer and said second hard layer.

12. The door according to claim 10, in which said reinforcing layer is stainless steel.

13. The door according to claim 10, in which said carbonizing layer comprises an organic fibrous layer.

14. A door comprising:

a first outer skin;

a second outer skin spaced from said first outer skin;

a carbonizing layer, said carbonizing layer comprising a material adapted to burn under thermal attack to a carbonized layer that is difficult to burn further;

a reinforcing layer, said reinforcing layer comprising a plurality of sheet reinforcement members extending from said first outer skin to said second outer skin, and said carbonizing layer being provided between adjacent sheet reinforcement members of said reinforcing layer;

and a plurality of pipes filled with cement being provided between said first outer skin and said second outer skin.

15. The door according to claim 14, wherein said reinforcing layer comprises a corrugated metal insert and said corrugated metal insert is welded to said first outer skin and said second outer skin.

16. A door comprising a first and a Second hard layer in combination with a carbonizing layer and a reinforcing layer, said carbonizing layer comprising a material adapted to burn under thermal attack to a carbonized layer that is difficult to burn further, said reinforcing layer comprising a sheet of corrugated metal having a plurality of corrugations, said corrugations alternately contacting said first hard layer and said second hard layer and said carbonizing layer being provided within said corrugations of said reinforcing layer.

17. The door according to claim 16, wherein said reinforcing layer is made of stainless steel.

18. The door according to claim 16, wherein said carbonizing layer comprises an organic fibrous layer.

19. The door according to claim 16, wherein the door further comprises a resilient layer.

20. The door according to claim 16, wherein the door further comprises a mobile layer, said mobile layer comprises a mesh material held lightly so that said mobile layer can move when force is applied to said mobile layer.

21. The door according to claim 16, wherein the door further comprises a clogging layer.

22. The door according to claim 21, wherein the clogging layer includes an asphalt shingle material.

23. The door according to claim 21, wherein the clogging layer includes fibrous materials.

* * * * *